United States Patent
Perrier et al.

(10) Patent No.: US 9,248,586 B2
(45) Date of Patent: Feb. 2, 2016

(54) MOULDING TOOL FOR PRODUCING A COMPOSITE MATERIAL PART USING A FLEXIBLE PREFORM COMPOSED OF A SKIN AND PROFILED PREFORMS FIRMLY ATTACHED TO SAID SKIN

(75) Inventors: Christophe Perrier, Toulouse (FR); Christophe Laumonier, Muret (FR); Denis Pingon, Hauteville (FR); Claude Canavese, Groissiat (FR)

(73) Assignee: Compose, Bellignat (FR)

( * ) Notice: Subject to any disclaimer, the term of this patent is extended or adjusted under 35 U.S.C. 154(b) by 330 days.

(21) Appl. No.: 13/981,206

(22) PCT Filed: Feb. 2, 2012

(86) PCT No.: PCT/EP2012/000455
§ 371 (c)(1),
(2), (4) Date: Jul. 23, 2013

(87) PCT Pub. No.: WO2012/104084
PCT Pub. Date: Aug. 9, 2012

(65) Prior Publication Data
US 2013/0299672 A1    Nov. 14, 2013

(51) Int. Cl.
*B29C 33/00* (2006.01)
*B29C 33/48* (2006.01)
*B29C 43/32* (2006.01)
*B29C 70/46* (2006.01)
*B29C 43/36* (2006.01)

(52) U.S. Cl.
CPC .............. *B29C 33/00* (2013.01); *B29C 33/485* (2013.01); *B29C 43/32* (2013.01); *B29C 43/36* (2013.01); *B29C 70/46* (2013.01); *B29C 2043/3261* (2013.01)

(58) Field of Classification Search
CPC ...... B29C 33/00; B29C 43/32; B29C 33/485; B29C 70/34; B29C 70/46; B29C 43/36; B29C 2043/3261
See application file for complete search history.

(56) References Cited

U.S. PATENT DOCUMENTS 5,190,773 A   3/1993   Damon
2009/0035406 A1   2/2009   Cleary

FOREIGN PATENT DOCUMENTS

EP   1000725   5/2000
FR   2717735   9/1995

*Primary Examiner* — Yogendra Gupta
*Assistant Examiner* — Emmanuel S Luk
(74) *Attorney, Agent, or Firm* — Defillo & Associates, Inc.; Evelyn A Defillo

(57) ABSTRACT

The invention relates to a molding tool for producing a composite material part by coating, by means of a matrix, a flexible preform including a skin, and profiled elements delimiting a plurality of three-dimensional meshes of polyhedral shapes. This molding tool comprises a mold and a countermold made of a material having the same expansion coefficient as the preform. Furthermore, includes, for each three-dimensional mesh, a part for filling the latter, formed from a plurality of wedges (12-27) suitable for being interlocked and delimiting a free central volume (28, 29), and from a blocking part (40) suitable for ensuring a relative blocking of said blocking part and of the wedges (12-27), the wedges and blocking parts being produced from a material having an expansion coefficient suitable for obtaining a predetermined compaction of the preform for the polymerization temperature of the matrix.

9 Claims, 5 Drawing Sheets

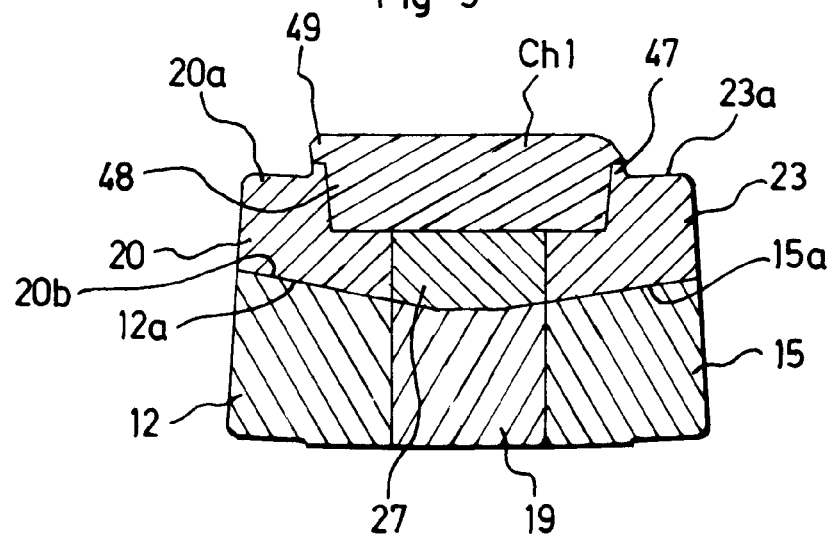
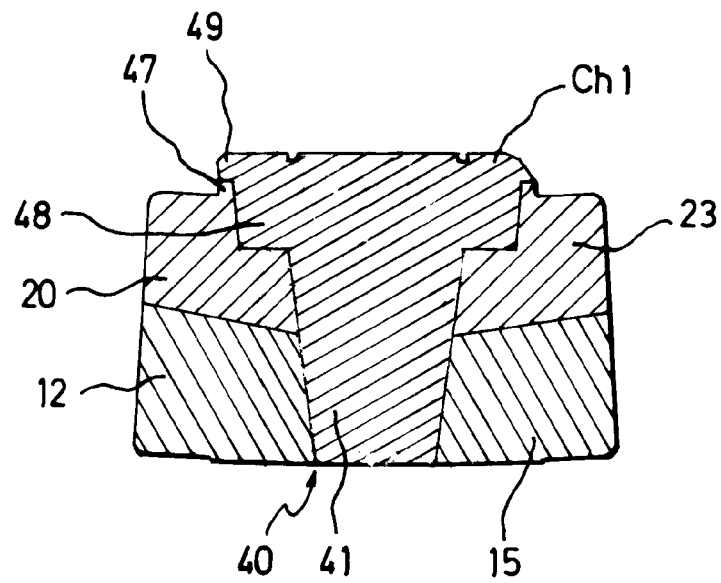

MOULDING TOOL FOR PRODUCING A COMPOSITE MATERIAL PART USING A FLEXIBLE PREFORM COMPOSED OF A SKIN AND PROFILED PREFORMS FIRMLY ATTACHED TO SAID SKIN

CROSS REFERENCE TO RELATED APPLICATION

This application is a national stage entry of PCT/EP2012/000455 filed Feb. 2, 2012, under the International Convention claiming priority over French Patent Application No. 1150927 filed Feb. 4, 2011.

FIELD OF THE INVENTION

The invention relates to a molding tool for producing a composite material part by coating, using a matrix, a flexible preform composed of a skin with a fibrous structure, and, firmly attached to said skin, profiled flexible preforms with a fibrous structure each comprising a core, arranged such that said cores delimit above the skin a plurality of three-dimensional meshes with polyhedral shapes.

BACKGROUND OF THE INVENTION

The composite materials which are composed mainly of preforms with a fibrous structure and a matrix generally consisting of a plastic material (thermoplastic or thermosetting resins) ensure the cohesion of the structure, and are being used increasingly frequently in many industries and in particular in the aeronautical and space industries.

The manufacture of the composite material parts requires firstly production of profiled preforms with a cross-section and/or shapes which are more or less complex, using elementary preforms which are cut out then formed and/or assembled mechanically for the purpose of obtaining the required profile.

Profiles of this type are then frequently firmly attached to skins with a fibrous structure, such as to produce panels made of composite materials comprising structural reinforcement elements.

Usually, the different profiles and the skin are then compacted before being installed in a molding tool, in which they are then assembled by coating by means of a matrix.

However, these assemblies are not suitable for withstanding consequent wrenching forces, such that wrenching forces of this type make it necessary to reinforce the assemblies by means of additional assembly units, conventionally consisting of mechanical assembly units of the rivet type.

Consequently, the production of composite panels which can withstand wrenching forces requires a plurality of successive steps (compacting, molding, mechanical assembly, etc.).

A process for production of complex steel sheet parts made of composite material is known for example from patent document FR 2 717 735. The molding tool comprises a matrix of flexible boxes previously compressed onto a skin of pre-impregnated fabric with a three-dimensional mesh. This mesh comprises bracing strips which are interposed as stiffeners between the boxes. However, this tool does not make it possible to coat flexible preforms which have not been previously compacted.

In addition, patent document EP 1 000 725 describes a mold matrix, the stainless steel materials of which have different thermal expansion coefficients in order to define inner cavities, so as to pre-compress the body to be molded.

The object of the present invention is to eliminate these disadvantages, and its main objective is to provide a molding tool which makes it possible to coat flexible preforms which have not been previously compacted, using a matrix.

SUMMARY OF THE INVENTION

For this purpose, the invention relates to a molding tool for producing a composite material part by coating, using a matrix, a flexible preform composed of a skin with a fibrous structure, and, firmly attached to said skin, profiled flexible preforms with a fibrous structure, known as profiles, each comprising a core, arranged such that said cores delimit above the skin a plurality of three-dimensional meshes with polyhedral shapes. According to the invention, this molding tool comprises: a mold provided with a bearing plate, known as the lower bearing plate, suitable for supporting the skin of the preform, and a peripheral belt which delimits a volume suitable for accommodating said preform;

for each three-dimensional mesh delimited by profiles, a part in a single piece for filling the volume of the mesh, formed by the assembly of:

a plurality of wedges which are designed to be interlocked and form a wall for lining cores of the profiles, delimiting a free central volume inside the three-dimensional mesh;

a blocking part which is suitable for being inserted in the free central volume of the three-dimensional mesh and for ensuring relative blocking of said blocking part and the wedges;

and a counter-mold mold provided with a bearing plate, known as the upper bearing plate, for closure of the mold;

the mold and the counter-mold being made of a material which has at least substantially the same expansion coefficient as the fibrous structure of the preform;

and the wedges and the blocking parts being made of a material which is designed to produce a part in a single piece with an expansion coefficient which is suitable for obtaining predetermined compacting of the skin and the profiles, for a predetermined temperature corresponding to the temperature of polymerization of the matrix.

According to the invention, the tool is thus designed to produce a composite material part by coating a flexible preform, i.e. a preform which has not been subjected to compacting before the molding operation.

According to the invention, this compacting is in fact carried out by means of the design of parts in a single piece with controlled expansion, which make it possible to compact the different parts with a fibrous structure directly in the tool, before they are coated by means of a matrix.

By means of this tool, the various preforms (skin, profiles, etc.) can thus be assembled by seam lines before being coated, and seam lines of this type lead to the creation of composite panels suitable for withstanding wrenching forces.

According to an advantageous embodiment, the wedges of each three-dimensional mesh comprise corner wedges suitable for being arranged in each corner of said three-dimensional mesh, and block-shaped wedges which are suitable for securing the corner wedges.

In addition, the wedges of each three-dimensional mesh advantageously delimit a central volume which has the general shape of a truncated pyramid, with a cross-section which decreases in the direction of the lower bearing plate of the mold, the blocking part consisting of part in the form of a block which is conjugated with that of said central volume.

In fact, these arrangements facilitate the operations of putting into place and removing the wedges, and also lead to formation of a part in a single piece with great strength.

In addition, when the composite material part comprises profiles provided with a bearing plate in the extension of the core, according to the invention the wedges and the blocking parts of the three-dimensional meshes are advantageously suitable for delimiting flat support surfaces for said bearing plates. In addition, the counter-mold then advantageously comprises an upper bearing plate which is suitable for placing the bearing plates on said flat support surfaces.

According to another advantageous characteristic of the invention, the blocking part of each three-dimensional mesh has a height suitable for forming a prolongation in the extension of the corresponding central volume, the counter-mold having, for each of said three-dimensional meshes, a recess with a shape suitable for accommodating said prolongation of the blocking part.

According to another advantageous characteristic of the invention relating to the production of a composite material part comprising at least one peripheral profile provided with a bearing plate in the extension of the core, the mold incorporates, for each of said peripheral profiles with a bearing plate, a removable lateral stop wedge for said profile which is designed to be able to be withdrawn after strengthening of the bearing plate.

In addition, one of the advantageous applications of the tool according to the invention consists of the production of a composite material part comprising a curved wall.

For the purpose of this embodiment, and advantageously according to the invention, the mold has a curved lower bearing plate and each wedge is constituted by two superimposed wedges, i.e.:

a wedge, known as the lower wedge, provided with a lower surface which is curved in a manner conjugated with the upper bearing plate of the mold;

a wedge, known as the upper wedge, provided with a flat upper surface for support of a bearing plate;

each pair of lower and upper wedges having joining surfaces which are set back relative to the equivalent portions of the upper surface of the three-dimensional mesh.

A tool of this type thus makes it possible very simply to compact and mold flexible preforms with undercuts. In fact, the division of each wedge into two specific complementary wedges makes it possible to withdraw in succession each of the two wedges of the pair of wedges, despite the existence of undercuts, and consequently makes it possible to dismantle the different elements of the parts in a single piece.

In addition, advantageously, the lower wedges of each three-dimensional wedge define an upper surface with a generally concave shape, the upper wedges defining a lower surface with a generally convex shape which is conjugated with said concave upper surface.

In a similar vein, the invention makes possible the creation of a composite material part comprising at least one peripheral profile provided with a bearing plate, which intersects the plane of curvature. For this purpose, the removable lateral stop wedge of this profile is advantageously constituted by two, lower and upper, superimposed wedges.

BRIEF DESCRIPTION OF THE DRAWINGS

Other characteristics, objects and advantages of the invention will become apparent from the following detailed description provided with reference to the attached drawings, which represent by way of non-limiting example a preferred embodiment. In these drawings:

FIG. 5 is a longitudinal cross-section on a plane B of this part in a single piece represented in the assembled mode;

FIG. 6 is a longitudinal cross-section on a plane C of this part in a single piece represented in the assembled mode.

DETAILED DESCRIPTION OF THE INVENTION

Figure 1:
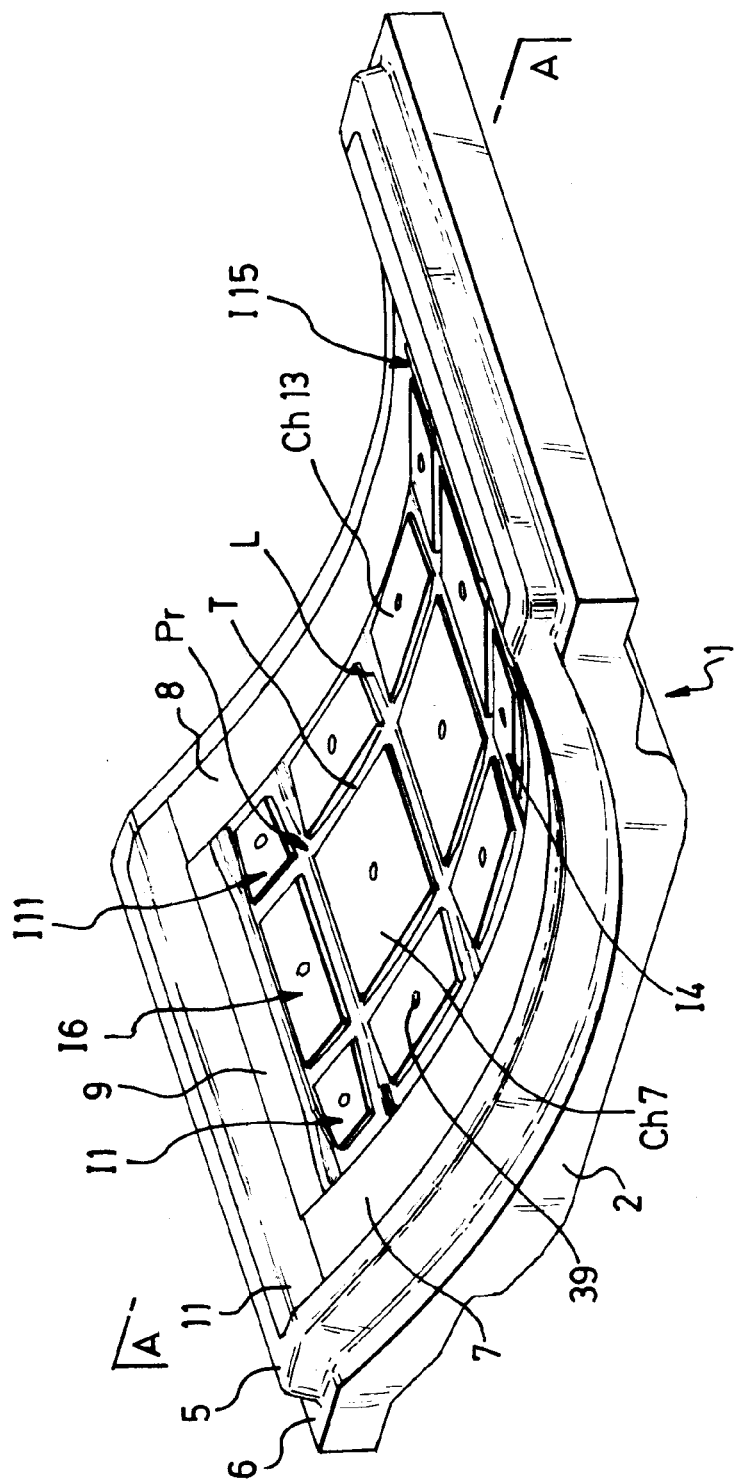
FIG. 1 is a view in schematic perspective of a mold of a molding tool according to the invention.
Figure 2:
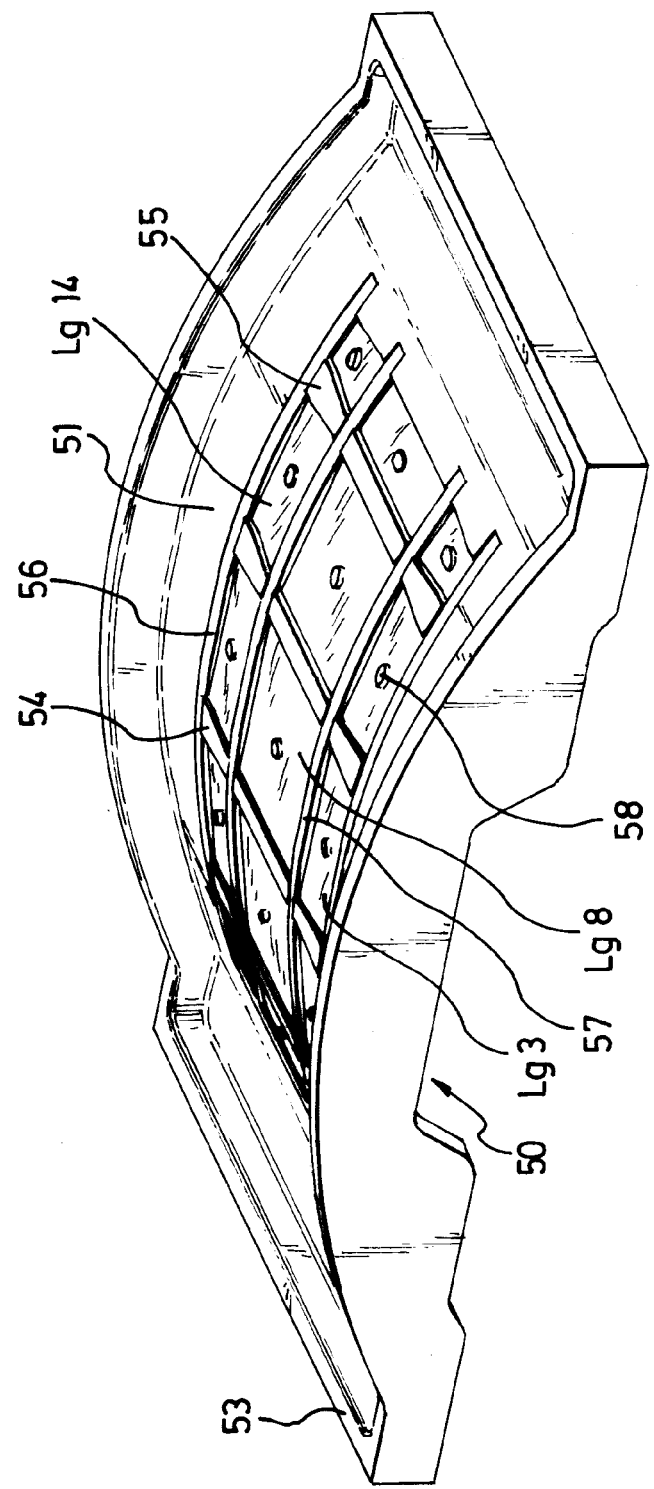
FIG. 2 is a schematic view in perspective of the counter-mold of this tool, represented in a position which is inverted relative to its position of closure of the mold in FIG. 1.
Figure 3:
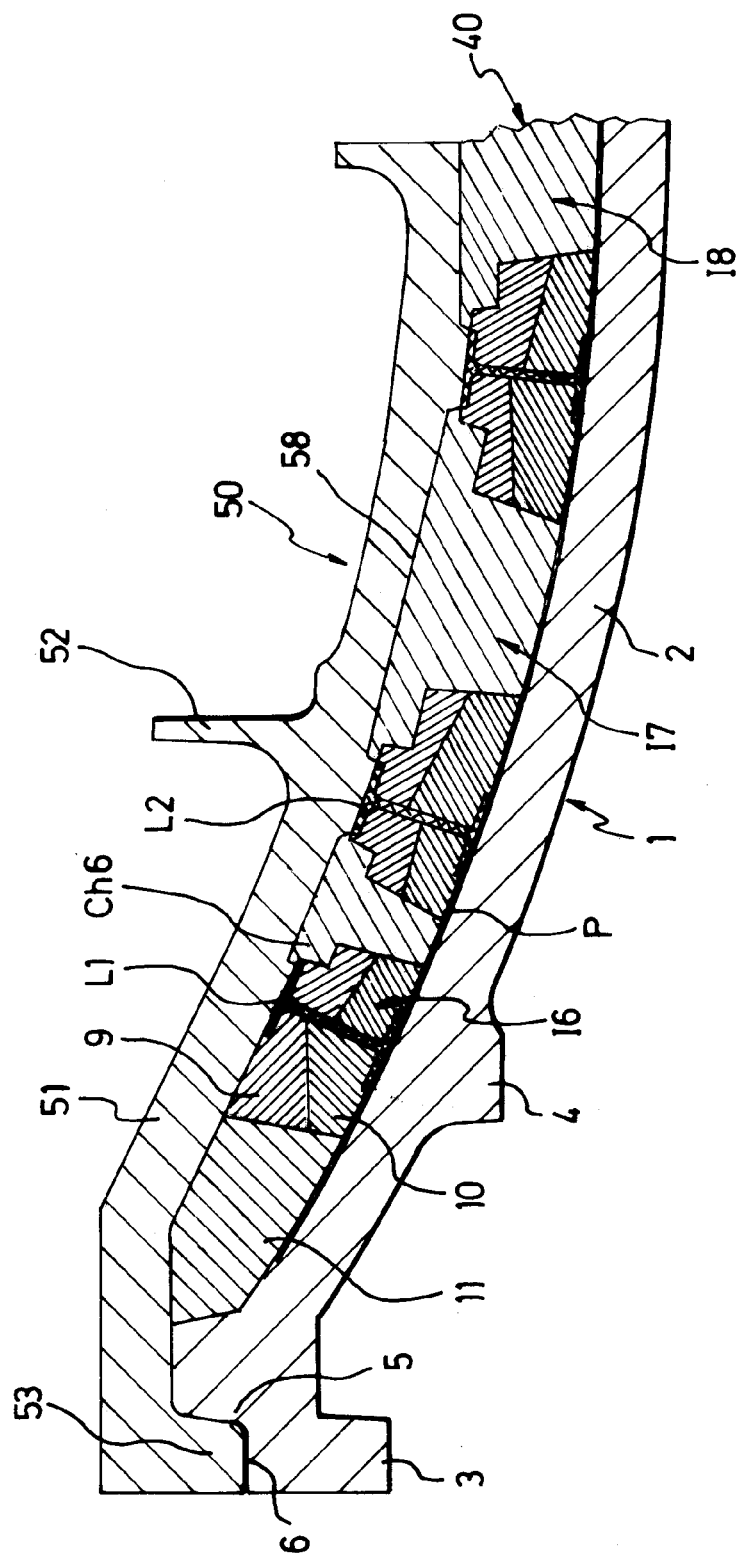
FIG. 3 is a partial longitudinal cross-section according to a plane A of the tool according to the invention, in the closed position of the mold and the counter-mold.

The molding tool represented by way of example in the figures is designed in particular for the creation by molding of a flexible preform Pr, with a fibrous structure, of an aircraft door of the type described in particular in patent FR2928620, comprising as represented in the appended figures: a panel in the form of an arch consisting initially of a skin P, on which there are positioned firstly six longitudinal members L, L1, L2 all in one piece, including two peripheral longitudinal members such as L1, and four cross members such as T, including two peripheral cross members, each divided into five sections which extend between the longitudinal members L.

It should be noted that in the present description, the terms longitudinal, transverse, longitudinal members, cross members, etc. are used with reference to the longitudinal and transverse axes of an aircraft equipped with the door described.

Firstly, the tool comprises a mold 1 comprising a lower bearing plate 2 below which there extend longitudinal members such as 3 and 4 for positioning of said mold on a press plate. This lower bearing plate 2 comprises a concave upper surface which is designed to put into place the skin P of the preform Pr, bordered by a perimeter rib 5 which delimits a peripheral rebate 6.

In the deployed position of the skin P and of the cross members T and longitudinal members L on this concave surface, the preform Pr thus comprises three-dimensional meshes with a curved parallelepiped shape. In the example there are 15 of these meshes with the references I1 to I15, each delimited by the cores of two cross members T and two longitudinal members L, and the upper surface of which is partially closed on its periphery by the wings which extend said cores.

Along each of the transverse sides of the rib 5, this mold additionally comprises a curved transverse wedge 7, 8 which acts as a lateral stop for each of the peripheral cross members T of the panel Pr.

In addition, this mold 1 comprises two longitudinal wedges, which are each positioned such as to extend between one of the end sections of the two transverse wedges 7, 8.

According to the principle of the invention, each of these longitudinal wedges is in fact constituted by two superimposed longitudinal wedges 9, 10 designed to form a wedge which in particular can be slid laterally below the outer wing of one of the perimeter longitudinal members L1 of the preform Pr, and can be withdrawn after polymerization, despite the undercut which this outer wing forms.

For this purpose, these two, lower 10 and upper 9, wedges have complementary substantially trapezoidal cross-sections, such as, once they have been superimposed, to form a wedge provided with substantially parallel upper and lower surfaces. In addition, their joining surfaces are inclined relative to the upper and lower surfaces, such as to make it possible to withdraw the upper wedge 9 without applying stress on the polymerized preform.

The mold 1 additionally comprises a longitudinal locking wedge 11, with a shape which is designed to be positioned between each longitudinal wedge 9-10 and the corresponding longitudinal side of the rib 5.

For each three-dimensional mesh I1-I15, the tool according to the invention also comprises a part in a single piece for filling of the volume of this mesh, which can be dismantled into a plurality of basic elements designed to be able to:

be assembled "in situ" for the purpose of mounting of this part in a single piece before the molding operation;

be dismantled, after molding, for the purpose of permitting the withdrawal of the part in a single piece despite the undercuts formed by the polymerized wings of the cross members T and longitudinal members L.

Figure 4A:
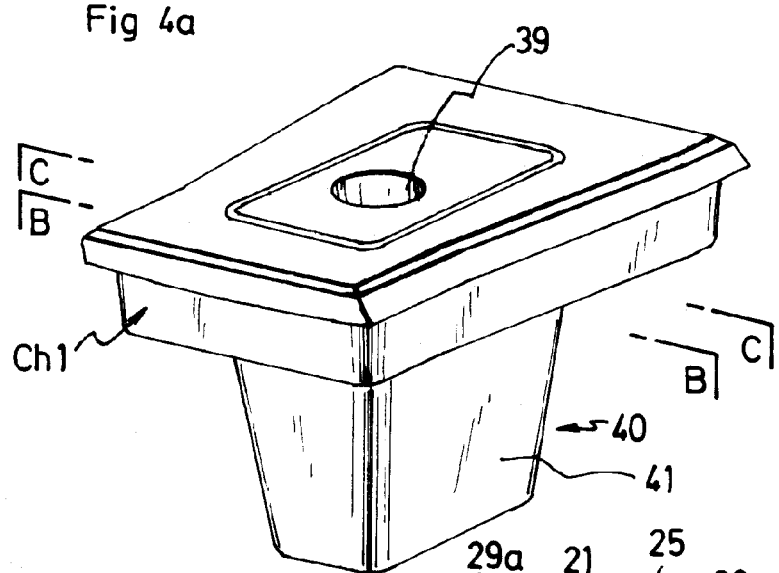
FIGS. 4a, 4b and 4c are views in perspective representing the different component elements of a part in a single piece according to the invention.
Figure 4B:
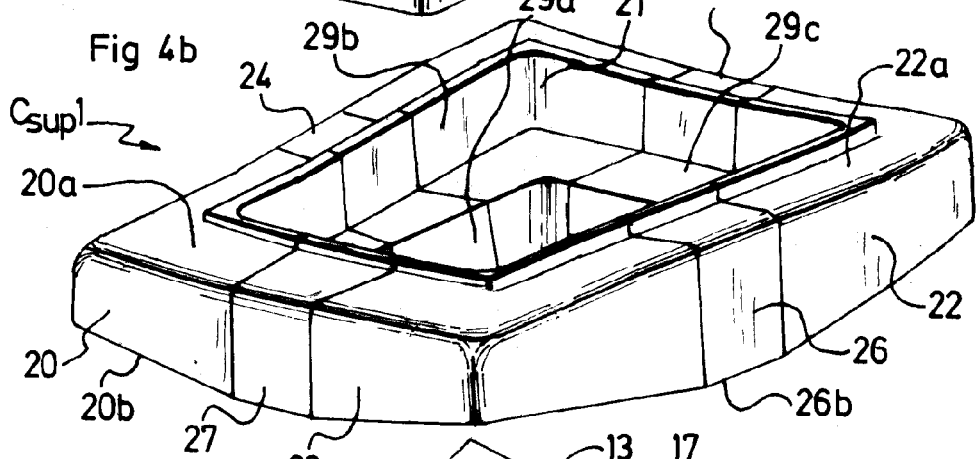
Figure 4C:
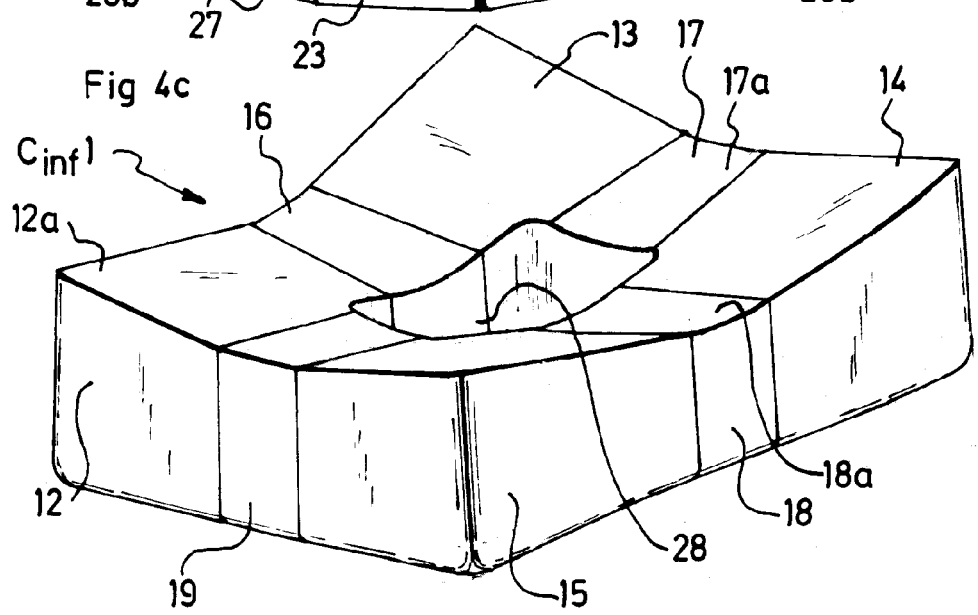

By way of example, FIGS. 4a to 4c represent the various elements which constitute the part in a single piece which is suitable for being accommodated in the mesh I1 of the preform Pr.

These elements comprise firstly a first series of eight wedges which are suitable for being supported on the skin P by their lower surface, and for forming the lower bearing Cinf1 of a wall for lining of the cores of the profiles L, T, thus delimiting a free central volume 28 which is in the shape of a truncated pyramid with a cross-section which decreases in the direction of the mold 1.

These eight wedges consist of four corner wedges 12-15 which are suitable for being arranged in each corner of the three-dimensional mesh, and along each of the four cores of the profiles T, L, there is a block-shaped wedge 16-19 which is suitable for securing the corner wedges 12-15.

The elements of the part in a single piece also comprise a second series of eight wedges 20-27 which are each designed to be supported on the upper surface, such as 12a, 17a, 18a, of one of the wedges 12-19 of the first series by their lower surface such as 20b, 26b, and to form the upper bearing Csup1 of the wall for lining of the cores of the profiles L, T.

These eight wedges 20-27 additionally comprise a flat upper surface such as 20a, 22a for support of the wing of the adjacent profile, said upper surfaces being bordered by an inner peripheral rib 47.

As previously, these eight wedges 20-27 delimit a free central volume 29, the latter being divided into two superimposed sections which are separated by a radial shoulder 29c:

a lower section 29a which extends in the continuity of the central volume 28 of the lower bearing Cinf; and an upper section 29b with a rectangular parallelepiped form with dimensions larger than those of the lower section 29a, bordered on its periphery by the rib 47.

As previously, these eight wedges 20-27 consist of four corner wedges 20-23 which are suitable for being arranged in each corner of the three-dimensional mesh, and along each of the four cores of the profiles T, L there is a block-shaped wedge 24-27 which is suitable for securing the corner wedges 20-24.

As represented in FIGS. 4a to 4c, each pair of lower 12-19 and upper 20-27 wedges has respectively upper joining surfaces such as 12a, 17a, 18a, and lower joining surfaces such as 20b, 26b, which are set back relative to the equivalent portions of the upper surface of the three-dimensional mesh.

Thus, each upper wedge 20-27 can be withdrawn after polymerization, despite the undercut formed by the wings of the profiles L, T, the lower wedges 12-19 also subsequently being able to be withdrawn without any problem.

Finally, the part in a single piece comprises a blocking part 40 comprising, all in one piece:

a lower block 41 which has the general shape of a truncated pyramid, and is suitable for being inserted in the central volume in the shape of a truncated pyramid 28, 29a of the three-dimensional mesh, and for ensuring relative blocking of said blocking part and the wedges 12-19, 20-27;

an upper block or cover Ch1 consisting of two superimposed sections with rectangular parallelepiped shapes:

a lower section 48 which is suitable for being accommodated in the upper section 29b of the central volume 29 delimited by the wedges 20-27; and an upper section 49 which is suitable for being supported on the rib 47, and for extending in the upper extension of the upper surfaces of the wedges 20-27.

Finally, the cover Ch1 has an upper surface in which there is provided an indexing receptacle 39 with a generally ovoid shape.

The other meshes I2-I15 are associated with parts in a single piece with the same design as that previously described, such that the upper surface of the mold 1 equipped with parts in a single piece of this type is, as represented in FIG. 1, in the form of a plurality of covers such as Ch7, Ch13 which form projections relative to the wings of the profiles L, T.

Finally, the tool comprises a counter-mold 50 for closure of the mold 1, provided with an upper bearing plate 51, for closure of the three-dimensional meshes of the preform Pr, on which there extend stays such as 52 for positioning of said counter-mold 50 on a press plate.

This upper bearing plate 51 comprises a lower surface which is complementary to the upper surface of the mold 1 equipped with the parts in a single piece, surrounded by a border 53 which is suitable for being accommodated in the rebate 6 of the mold 1.

For this purpose, this lower surface comprises flat surface strips 54, 55, 56, 57, with shapes and arrangements which are identical to those of the upper surfaces of the profiles T, L, suitable for being positioned on the latter, between which there are provided recesses such as Lg3, Lg8, Lg14, each suitable for accommodating the upper section 49 of a cover Ch1, Ch13, etc., and into each of which there projects a centering unit 58 with a shape which is suitable for being accommodated in the indexing receptacle 39 of the cover opposite.

Finally, the mold 1 and the counter-mold 50 are made of a material such as "Invar®", with at least substantially the same expansion coefficient as the fibrous structure of the preform Pr.

The wedges 12-19 and 20-27 and the blocking parts Co1-Ch1 etc. are for their part made of a material such as aluminum, and are calculated such that each part in a single piece has an expansion coefficient which is suitable for obtaining predetermined compacting of the skin and of the profiles, for a predetermined temperature corresponding to the temperature of polymerization of the matrix.

The tool according to the invention is thus designed to produce a composite material part by coating of a flexible preform, i.e. a preform which has not been subjected to compacting before the molding operation.

In fact, according to the invention, this compacting is carried out by means of the design of parts in a single piece with controlled expansion which are perfectly indexed relative to a fixed reference.

What is claimed is:

1. A molding tool for producing a composite material part by coating, using a matrix, a flexible preform composed of a skin with a fibrous structure, and, firmly attached to said skin, profiled flexible preforms with a fibrous structure, each comprising a core, arranged such that said cores delimit above the skin a plurality of three-dimensional meshes with polyhedral shapes, said molding tool comprising:

- a mold provided with a lower bearing plate, known as the lower bearing plate, suitable for supporting the skin of the preform, and a peripheral belt which delimits a volume suitable for accommodating said preform;
- for each three-dimensional mesh delimited by profiles, a part in a single piece for filling the volume of said mesh, formed by the assembly of:
- a plurality of wedges which are designed to be interlocked and form a wall for lining cores of the profiles, delimiting a free central volume inside the three-dimensional mesh;
- a blocking part which is suitable for being inserted in the free central volume of the three-dimensional mesh and for ensuring relative blocking of said blocking part and the wedges;
- and a counter-mold provided with a bearing plate, known as the upper bearing plate, for closure of the mold;
- this tool the mold and the counter-mold are made of a material which has at least substantially the same expansion coefficient as the fibrous structure of the preform, and in that the wedges and the blocking parts are made of a material which is designed to produce a part in a single piece with an expansion coefficient which is suitable for obtaining predetermined compacting of the skin and the profiles, for a predetermined temperature corresponding to the temperature of polymerization of the matrix.

2. The molding tool as claimed in claim 1, wherein the wedges of each three-dimensional mesh comprise corner wedges suitable for being arranged in each corner of said three-dimensional mesh, and block-shaped wedges which are suitable for securing the corner wedges.

3. The molding tool as claimed in claim 1, wherein the wedges of each three-dimensional mesh delimit a central volume which has the general shape of a truncated pyramid, with a cross-section which decreases in the direction of the lower bearing plate of the mold, the blocking part including a part in the form of a block which is conjugated with that of said central volume.

4. The molding tool as claimed in claim 1 for the production of a composite material part comprising profiles provided with a bearing plate in the extension of the core, wherein the wedges and the blocking parts of the three-dimensional meshes delimit flat support surfaces for said bearing plates, the counter-mold comprising an upper bearing plate which is suitable for placing said bearing plates on said flat support surfaces.

5. The molding tool as claimed in claim 4, wherein the blocking part of each three-dimensional mesh has a height suitable for forming a prolongation in the extension of the corresponding central volume, the counter-mold having, for each of said three-dimensional meshes, a recess with a shape suitable for accommodating said prolongation of the blocking part.

6. The molding tool as claimed in claim 4 for the production of a composite material part comprising at least one peripheral profile provided with a bearing plate in the extension of the core, wherein the mold incorporates, for each of said peripheral profiles with a bearing plate, a removable lateral stop wedge for said profile.

7. The molding tool as claimed in claim 4, wherein the mold has a curved lower bearing plate for the production of a composite material part comprising a curved wall, wherein each wedge is constituted by a lower and an upper superimposed wedges:

- the lower wedge, provided with a lower surface which is curved in a manner conjugated with the upper bearing plate of the mold;
- the upper wedge, provided with a flat upper surface for support of a bearing plate;
- each pair of lower and upper wedges having joining surfaces which are set back relative to the equivalent portions of the upper surface of the three-dimensional mesh.

8. The molding tool as claimed in claim 7, wherein the lower wedges of each three-dimensional mesh define an upper surface with a generally concave shape, the upper wedges defining a lower surface with a generally convex shape which is conjugated with said concave upper surface.

9. The molding tool as claimed in claim 6, for the production of a composite material part comprising at least one peripheral profile provided with a bearing plate, which intersects the plane of curvature, characterized in that the removable lateral stop wedge of said profile is constituted by two, lower and upper, superimposed wedges.

* * * * *